Aug. 6, 1963  E. J. MADERE  3,099,890
SHRIMP TRAP WITH SNAP-ON FUNNELS
Filed Nov. 28, 1961  2 Sheets-Sheet 2
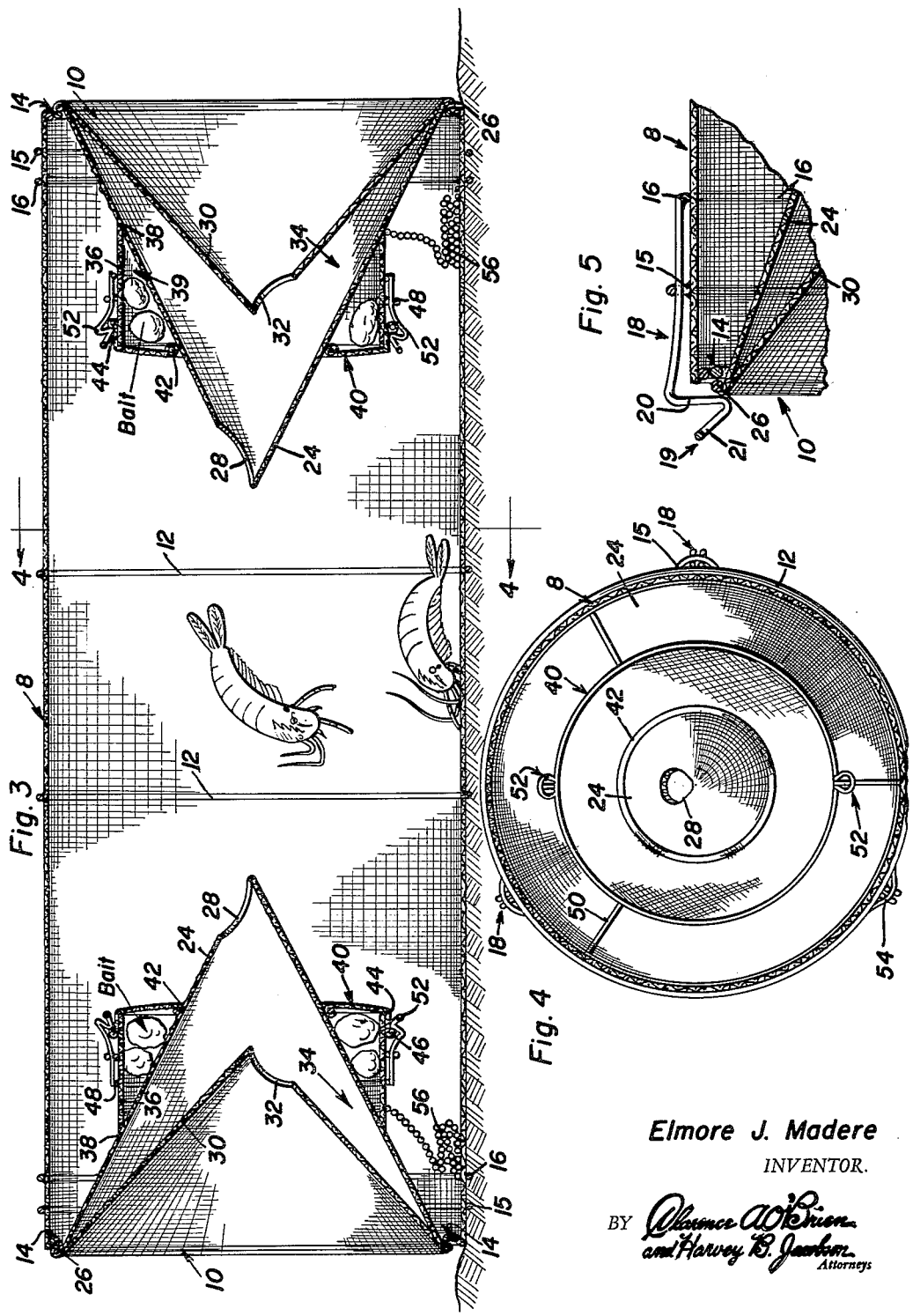
Elmore J. Madere
INVENTOR.

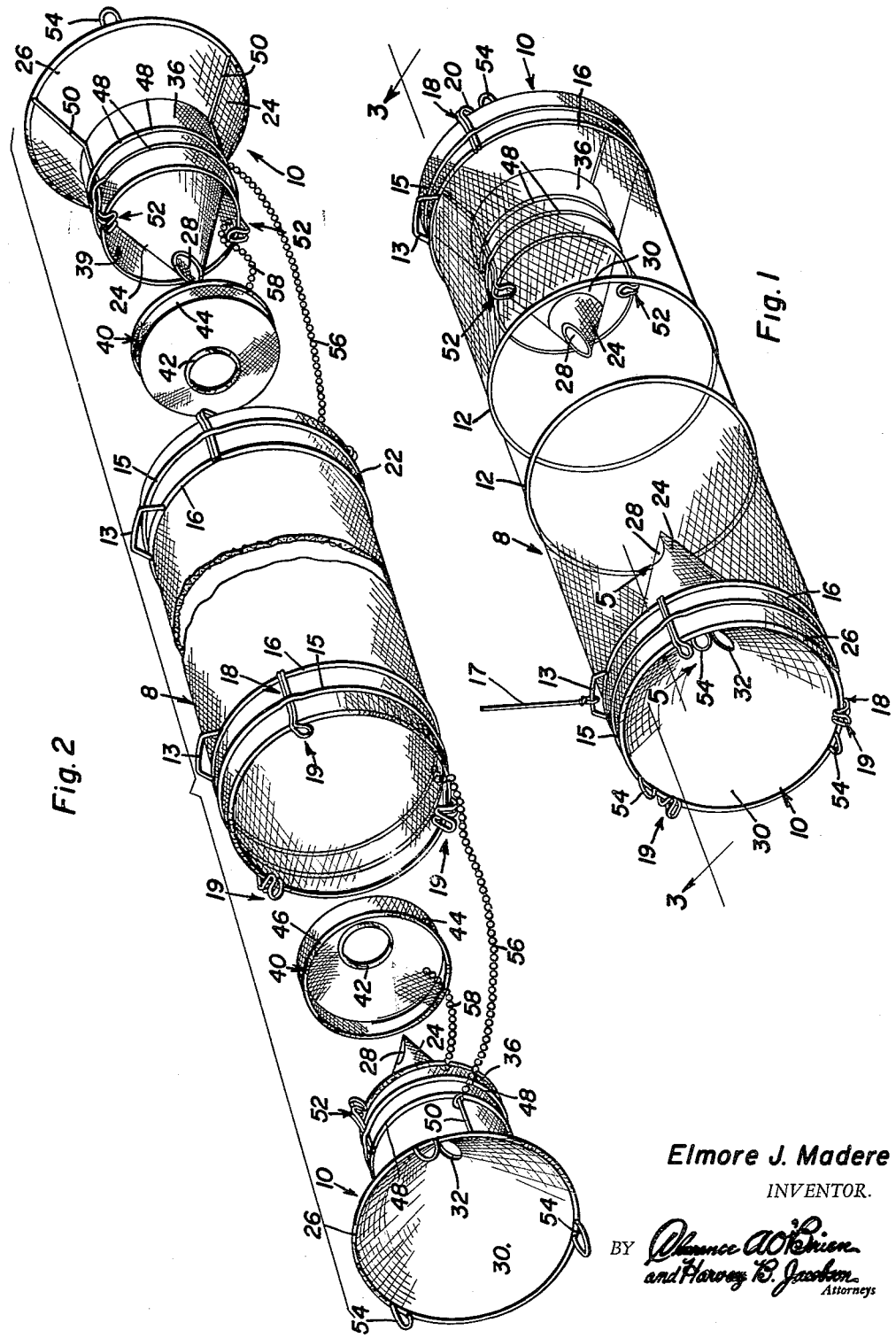

United States Patent Office 3,099,890
Patented Aug. 6, 1963

3,099,890
SHRIMP TRAP WITH SNAP-ON FUNNELS
Elmore J. Madere, Rte. 1, Box 1194D, Reserve, La.
Filed Nov. 28, 1961, Ser. No. 155,278
4 Claims. (Cl. 43—100)

This invention relates to certain new and useful improvements in a trap which is ingeniously designed and structurally and expressedly adapted to skillfully and effectually catch shrimp, crayfish and similar small fish.

It is common practice in the art to which the invention relates to provide an openwork cage having open ends which are closed, or approximately so, by truncated conical inlet funnels. Such prior art traps are usually made of netting or net-like material and, in some instances, of suitably perforated sheet material. A typical trap having a single funnel is shown in the Smith turtle trap 1,927,599. Another example trap somewhat more akin to the instant invention is that disclosed in Hurtig 2,935,811, for crawfish and structurally similar in that it comprises an open-ended cage body of netting having telescoping end funnels. Such traps as these and many others (not necessary to identify) have significant faults. One disadvantage is the short life of easily rupturable net material. Therefore, in carrying out the present invention the essential components or parts are made of light weight but strong and durable shape-sustaining hardware cloth. Sturdily constructed the life of the instant heavy duty trap is appreciably extended. The user will find it much easier to unload the catch and does not have to cope with entangled cords or broken strands.

More important, the present trap is advantageous over others in that novelly constructed readily insertable and removable end closures are of unified construction and may be applied and removed with ease, not only saving valuable time and labor but enabling the trapper to empty his catch from the cage simply by removing one closure, then dumping same into a bucket or the like.

Ordinarily, a single funnel only is used at each end of the cage (as in Hurtig's patent) and the inner truncated end is cut straight across with the result that escape from the trapping space is common. In fact, it is not too difficult for the victims to accomplish. To cope with and counteract this undesirable result and structural inadequacy the present trap is provided at each end with a funnel-within-a-funnel closure unit. The truncated ends of the two permanently joined funnels are not only cut on a bias, the oblique angled cuts are in opposite directions, whereby to minimize the chances of trapped shrimp escaping.

The present invention features the dual funnel principle of construction for the reason that the inner funnel is smaller and shorter than the outer one and the space between the funnels provides an initial or ancillary trap which functions to induce the victims to enter the main trap (the cage) rather than turn back to escape from the difficult-to-cope-with twin funnels.

Then, too, novelty is predicated on chaining or otherwise flexibly anchoring the dual-funnel closure units so that they cannot be misplaced or distressingly dropped overboard and lost as is so frequently the case with prior art adaptations.

The manner in which the instant trap is baited is highly significant. It is the customary practice to simply load the central portion of the cage with enticing bait of one kind or another. Naturally, the bait thus positioned is not only exposed and can be had from the outside, but is quickly used up by the shrimp already in the trap, leaving none for potential victims. To offset this disadvantage, the present invention is original. This is to say, the bait is housed in a unique bait compartment, a detachable but component part of the insertable and removable dual funnel unit or closure. More particularly, it comprises a small openwork wire bait cage, which is carried by and surrounds the tapering end portion of the longer outer funnel and which isolates the bait yet gives off a potent scent, lures and entices the victims into the main cage by way of the associated coacting twin funnels. However, and since the bait cannot be eaten (because it is caged and is spaced from the surrounding wall of the main cage) it remains substantially intact and serves its tricky purpose for as long as it remains attractive and worthy of use.

Novelty is also predicated on the manner in which suitable strong but easy-to-use latch-like catches are provided at the open ends to the cage for snapping and securely retaining the bait carrying twin funnel end closures in reliable cage-closing position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of a shrimp trap constructed in accordance with the principles of the invention and readied for use;

FIGURE 2 is an exploded perspective view, partly in section, which illustrates all of the essential components or parts in their ready-to-use relationship;

FIGURE 3 is a section on a larger scale taken on the plane of the section line 3—3 of FIGURE 1;

FIGURE 4 is a transverse section on the line 4—4 of FIGURE 3; and

FIGURE 5 is an exaggerated detail section on the line 5—5 of FIGURE 1.

Briefly the overall trap (some four-feet in length and a foot or so in cross-section) is characterized by the trap proper herein set forth as a cage 8 and a pair of readily insertable and removable twin funnel units also (referred to as end closures) for the respective open ends of the cage, these units being identical and denoted generally at 10.

The cage 8 is of elongated tubular or hollow form and is of sturdy openwork construction and is preferably made from rigid shape-sustaining hardware cloth. This cage is cylindrical in cross-section and is of an easy-to-handle size and weight. The central portion of the cage (FIGS. 1 and 3) is provided exteriorly with suitably secured spaced parallel reinforcing or rigidifying rings 12. The respective entrance ends are likewise reinforced by interior ring-like frames and made up of concentric suitably connected inner and outer rings 14 as shown in FIG. 5. Similar heavy wire reinforcing rings 15 and 16 are fastened exteriorly around the cage ends as shown in FIG. 5. The ring 16 carries an eye 13 to which an anchoring cord 17 is attached (FIG. 1). In practice any number of traps are set out for use by the user. Ordinarily and as is common with shrimp traps a trotline (not shown) is employed and the upper ends of the attaching cords 17 are attached to the trotline at suitable longitudinally spaced places. The rings 15 and 16 are provided with several equi-distant circumferentially spaced spring wire snap-type catches or latches 18 which are welded in place at circumferentially spaced points and each latch or catch is provided with an outwardly projecting terminal finger-piece or grip 19 to facilitate the use and operation of the catch. Each catch has a lateral inwardly bent portion 20 and an inclined pressure responsive trip 21 which functions in a self-evident manner. These catches are forced to spring to an open position and then automatically close in a manner to releasably hold the adjacent cooperating closure unit 10 in place in a manner to be hereinafter set forth.

Inasmuch as each closure unit 10 is the same in construction a description of one unit will suffice for both. To this end and with reference first to FIG. 3 it will be seen that the outer longer funnel (made of hardware cloth) is denoted by the numeral 24 and is of truncated conical form. The outer open end thereof is suitably secured to a reinforcing ring 26 which abuts the rim-forming rings 14 and aligns therewith, when in use (FIG. 5). This funnel 24 is of suitable length and cross-section. The truncated terminal 28 is cut on a bias in the manner shown. The companion inner truncated conical funnel 30 likewise has its outer or larger end secured to the ring 26, both funnels telescoping in twin relationship and concentric to each other in the manner illustrated. The inner funnel is smaller and shorter and the truncated end 32 is also cut on an oblique angle or bias. It should be observed from FIGURE 3 that these openings 28 and 32 are angled or pitched in directions opposite to each other in such a manner as to minimize chances of an incoming victim turning back and escaping. The space 34 between the two funnels 24 and 30 provides an initial or ancillary trap with the result that once the victim enters this trapping space 34 it is attracted to the seemingly more readily accessible "way out," namely the exit 28. Consequently the victim is instinctively induced to enter the main trapping space in the cage 8 in a self-evident manner. The end closure, the unit 10, also includes a third component part; namely, a unique bait holder or compartment comprising an openwork sleeve or collar 36 which is cylindrical and which surrounds the median portion of the larger or outer funnel 24. One end of this sleeve 36 is attached as at 38 and the other end is circumferentially spaced from the funnel 24, the intervening pocket or space 39 providing a bait storing and retaining compartment as shown in FIG. 3. This novel bait holder also includes an attachable and detachable closing cover or cap 40 and which is made of rigid hardware cloth. The cap may be said to be annular in that it has a central opening 42 embracing the median portion of the funnel 24. The cap is further provided with a marginal flange 44 (FIG. 2) reinforced at its edge with a suitable wire ring 46. Reinforcing rings 48 surround the median portion of the sleeve and are secured and further reinforced by cooperating longitudinally extending rigidifying rods in the manner evident, it is believed, from the drawing. These rings 48 are provided with self-closing spring latches which are here referred to as clips 52 and which are engageable with the ring 46 and consequently serve in this manner to hold the cap in its closed but nevertheless detachable position. This readily attachable and detachable cap construction facilitates loading and emptying the novel isolated bait compartment.

The open end of the twin funnel assembly is provided with several circumferentially spaced outstanding loops 54 which may be sufficiently large to provide finger-holds and which consequently assist in the step of inserting and removing the baited closure unit 10. It is also desirable to provide a chain 56 as shown in FIG. 2, one end of which is attached to the unit 10 and the other end suitably attached to the cage unit 8. This chain is important in that it prevents accidental loss of the unit 10 as is obvious. In addition another suitable chain 58 is provided and this chain is connected to the unit 10 at one end and to the cap 40 at the other end as shown to prevent accidental loss of the parts.

In practice it will be understood that the space 39 of the bait cage is loaded with suitable bait. The cap 40 is pressed into place and is held securely in its intended position by the spring latches 52. Then the assembled closure unit 10 is fitted into the intended open end of the cage 8. This is accomplished by inserting the assembly and forcing the ring-equipped end portion 26 against the inclined cam-like portions of the aforementioned retaining catches or latches 19. It is believed that this step can be ascertained by referring again to FIG. 5. Of course when the cage has been loaded and it is desired to empty the same, the latches or catches 19 are simply forced by hand to open position to release the unit or units 10 as the case may be. As to the mode of attaching the traps to the aforementioned trotline it is believed that since this is a procedure commonly practiced it is not necessary to dwell upon it here.

It is believed that a careful consideration of the description in conjunction with the drawings and claims will enable the reader to obtain a clear and comprehensive understanding of the construction, arrangement of parts, features and advantages and mode of use of the invention. Therefore, a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A shrimp trap comprising an elongated tubular cage made of substantially rigid hardware cloth and open at both ends, a readily applicable and removable closure unit for each end, each unit embodying a truncated conical funnel projecting telescopingly into the trapping space of said cage, a bait holding compartment encircling and attached to a median portion of said funnel, and readily accessible retainer means carried by the end portions of said cage for securing said closure units in operative position, each unit being provided with a second truncated conical funnel shorter than and fitting telescopingly into and within the encompassing confines of the first-named funnel, and the truncated ends of said funnels being cut at an angle oblique to the lengthwise axial center of said funnels, the obliquity of the cut of one funnel being disposed at an angle different from that of the other funnel to minimize the chances of an entrapped shrimp escaping by an exit route via the spaced truncated ends and first and second-named funnels.

2. For use on a cage having a reinforced open end; an insertable closure for said end comprising a relatively long outer truncated funnel, a rigidifying ring attached to an outer end of said funnel, an inner but shorter and smaller funnel also truncated and having an outer end attached to said ring, said inner funnel telescoping into the outer funnel and being spaced radially therefrom and providing an intervening trapping space, the truncated ends of said funnels being cut at an angle oblique to the lengthwise axial center of said funnels, the obliquity of the cut of one funnel being disposed at an angle different from that of the obliquity of the other funnel to minimize the chances of an entrapped shrimp escaping by an exit route via the truncated ends, a sleeve encircling said outer funnel and attached at one end to a median portion of said funnel and unattached and open at its other end and defining an endless bait holding and isolating compartment, and a readily attachable and detachable cover for and closing the open end, said cover comprising an annular cap having a marginal reinforced flange, and rings encompassing a median portion of said sleeve and provided with resilient latches cooperable with said reinforced flange.

3. In combination, a trapping cage open at at least one end and provided at said open end with external reinforcing means, resilient catches attached to circumferentially spaced portions of said reinforcing means, each catch having an outer end portion projecting beyond the open end of the cage and being provided with a finger-grip and further provided with an inclined cam-like portion which is responsive to pressure applied thereto, a readily insertable and removable closure unit embodying inner and outer truncated conical funnels having outer ends attached to and joined together by a reinforcing ring and said ring being engageable with the cam portion of the latches in a manner to force the latches to open position and to allow the unit to be fitted into a cooperating end of said cage and releasably held therein by said latches, a bait holder comprising a fabric sleeve encircling the outer funnel and attached thereto, resilient cap-retaining latches operatively mounted on said sleeve, and a closing cap having a centrally apertured portion and fitted over and encircling an end portion of the outer funnel and having a reinforced flange releasably engageable with and held in place by said latches.

4. A shrimp trap comprising an elongated cage having at least one end open, and a readily insertable and removable closure unit for said open end embodying a relatively long outer truncated funnel truncated at an inner end and provided at the end opposite said truncated end with a permanently attached rigidifying ring, an inner funnel shorter and smaller than the outer funnel and telescoping into the outer funnel and spaced inwardly from the interior surfaces of said outer funnel, the inner end of said inner funnel being truncated and the outer end being joined to said ring, the truncated ends of said funnels being cut at an angle oblique to the lengthwise axial center of said funnels, the obliquity of the cut of one funnel being disposed at an angle different from the obliquity of the cut of the other truncated end of the other funnel to minimize the chances of an entrapped shrimp escaping by an exit route via the spaced truncated ends of said funnels, a sleeve encircling the outer funnel between the respective ends of said funnel and having one end attached to said outer funnel and the other end spaced from the outer funnel with the space between providing an open-ended bait holding compartment, an annular cap providing a cover for said bait holding compartment, said cap being readily attachable to and detachable from the cooperating end of said sleeve, said cap having a marginal reinforcing flange, and fastening means mounted on said sleeve and cooperable with said flange and functioning to hold the cap in a compartment closing position.

References Cited in the file of this patent

UNITED STATES PATENTS

| | | |
|---|---|---|
| 418,233 | Sallade | Dec. 31, 1889 |
| 775,389 | Brooks | Nov. 22, 1904 |
| 785,287 | Broome | Mar. 21, 1905 |
| 893,943 | Sellman | July 21, 1908 |
| 1,376,801 | Downes | May 3, 1921 |

FOREIGN PATENTS

| | | |
|---|---|---|
| 75,795 | Denmark | May 4, 1953 |